United States Patent [19]

Self

[11] E Patent Number: Re. 32,197

[45] Reissued Date of Patent: Jul. 8, 1986

[54] HIGH ENERGY LOSS FLUID CONTROL

[75] Inventor: Richard E. Self, Los Alamitos, Calif.

[73] Assignee: Control Components, Inc., Irvine, Calif.

[21] Appl. No.: 418,435

[22] Filed: Sep. 15, 1982

Related U.S. Patent Documents

Reissue of:

[64] Patent No.: 3,514,074
Issued: May 26, 1970
Appl. No.: 730,978
Filed: May 6, 1968

U.S. Applications:

[63] Continuation of Ser. No. 809,645, Aug. 24, 1977, abandoned, which is a continuation-in-part of Ser. No. 599,229, Dec. 5, 1966, Pat. No. 3,451,404.

[51] Int. Cl.[2] ..... F15d 1/04

[52] U.S. Cl. ..... 251/127; 137/625.28; 137/625.3; 137/549; 138/42; 251/205

[58] Field of Search ..... 137/549, 625.28; 138/41, 42, 43, 44, 45, 46; 251/118, 126, 127, 205; 181/230, 275, 270, 268, 254, 241, 272

[56] References Cited

U.S. PATENT DOCUMENTS

| | | | |
|---|---|---|---|
| 801,093 | 10/1905 | Koehler | 137/545 X |
| 973,328 | 10/1910 | Willmann | 137/625.28 X |
| 996,704 | 7/1911 | Cribbins | 138/46 |
| 1,042,171 | 10/1912 | Talansier | 138/40 |
| 1,123,316 | 1/1915 | Kranz | 251/127 X |
| 1,234,251 | 7/1917 | Zorzytzki | 251/127 X |
| 1,243,134 | 10/1917 | Binckley | 251/31 X |
| 1,570,907 | 1/1926 | McKee | 251/127 X |
| 1,964,300 | 6/1934 | Perry et al. | 138/43 |
| 2,021,079 | 11/1935 | Mittendorf et al. | 138/42 |
| 2,126,991 | 8/1938 | Griswold | 138/42 X |
| 2,416,452 | 2/1947 | Marx | 181/272 |
| 2,587,016 | 2/1952 | Watts | 138/43 X |
| 2,722,942 | 11/1955 | Hencken | 251/118 X |
| 3,286,979 | 11/1966 | Brown et al. | 251/118 |
| 3,397,794 | 8/1968 | Toth et al. | 210/488 |

FOREIGN PATENT DOCUMENTS

| | | |
|---|---|---|
| 1008977 | 5/1957 | Fed. Rep. of Germany . |
| 1142479 | 1/1963 | Fed. Rep. of Germany . |
| 444102 | 7/1912 | France . |

OTHER PUBLICATIONS

Catalogue Publication TA 22586203 of Reinische Armaturen—Und Machinenfabrik, Albert Sempell of Monchengladbach, West Germany, Aug. 1962.

*Primary Examiner*—Arnold Rosenthal
*Attorney, Agent, or Firm*—Roland T. Bryan

[57] ABSTRACT

High energy loss fluid control is attained by subdividing flow of high pressure fluid into a plurality of individual streams in respective passageways having a long length to diameter ratio to impart high frictional resistance losses to the fluid flow, the passageways being in and between laminar surfaces and configurated along their lengths. For extremely high efficiency the passageways are in labyrinth formation.

41 Claims, 9 Drawing Figures

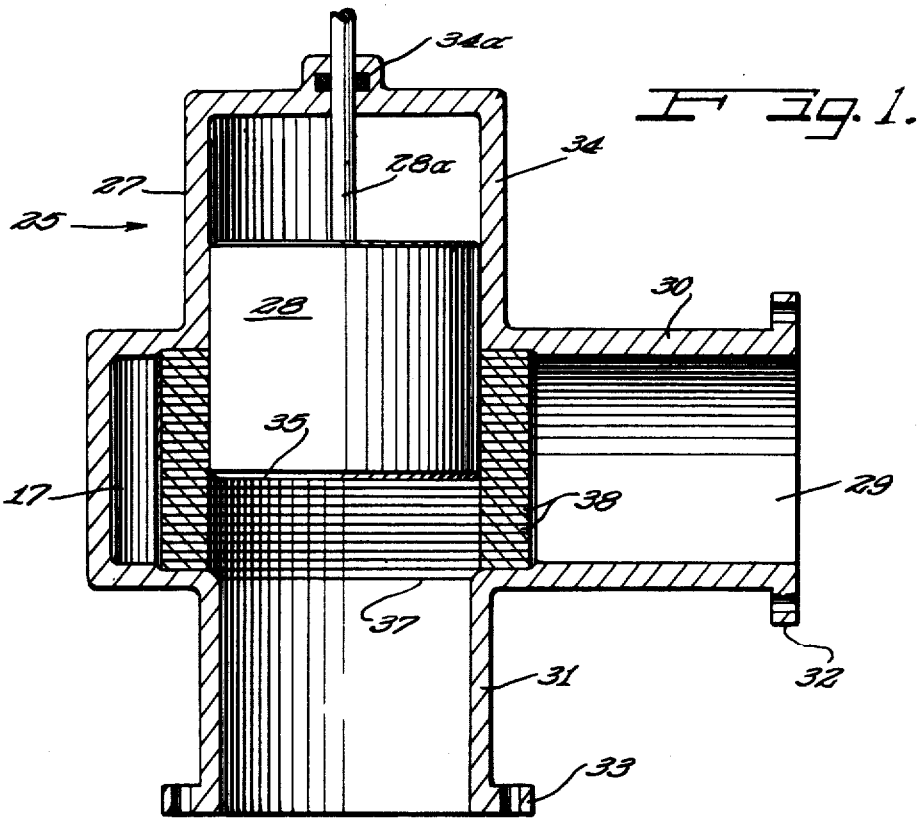
Fig. 1.
Fig. 2.
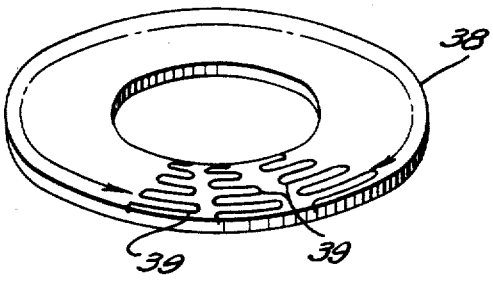
Fig. 3.
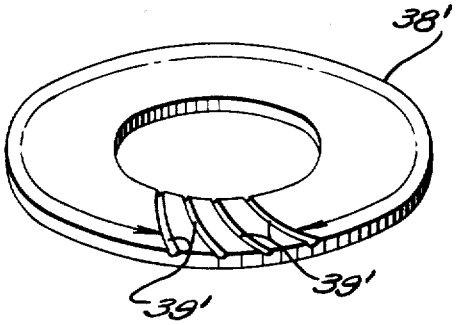

HIGH ENERGY LOSS FLUID CONTROL

Matter enclosed in heavy brackets [ ] appears in the original patent but forms no part of this reissue specification; matter printed in italics indicates the additions made by reissue.

The present application is a *continuation of Ser. No. 809,645, filed Aug. 24, 1977, now abandoned, which is a reissue of Ser. No. 04/730,978, filed May 6, 1968, now U.S. Pat. No. 3,514,074, granted May 26, 1970, which is* continuation-in-part of my application, Ser. No. 599,229 filed Dec. 5, 1966, now U.S. Pat. No. 3,451,404 granted June 24, 1969.

This invention relates to velocity control of high pressure flowing fluids and [having] *has* equal efficiency in respect to liquids and gases.

In the handling of flowing high pressure fluids, it has been customary to utilize orifice means having a high velocity short throat section, or valve means, to attain energy losses or high pressure drop. If the fluid is in a liquid state and liable to flash, that is, vaporize or turn to gaseous condition on the downstream side of the orifice or valve opening, it may condense implosively and induce damaging shock waves, cause erosion, and the like. For example, hot water or other liquid may flash or cavitate to steam or gas as it passes through the throat of the orifice or valve opening and may then recondense downstream with implosive action, resulting in energy losses but inducing high energy shock waves that may severely damage and erode the downstream section of a pipe or valve.

Of special importance to control valve operation, life and application, is the high velocity attained by the flowing medium as it passes through the valve. As the velocity of the fluid in the valve exceeds the velocity of the fluid in the line, several disturbing reactions occur. The most serious and immediate problem is rapid erosion of the valve seat and plug by direct impingement of the liquid or droplets and suspended foreign particles in either a gas or liquid. Additional erosion results from cavitation—high speed implosion of vapor against the trim and body. In addition to the severe problems resulting from erosion, the increased velocity also causes the flow characteristics of the valve to become unpredictable and erratic. This occurs because the changes in velocity significantly affect the valve vena contracta vortices and fluid enthalpies. Other objectionable problems created by the high fluid velocity in the valve are severe noise generation, trim fatigue and possible degradation of flowing fluid materials such, for example, as polymers.

These problems associated with high internal valve velocity have been widely recognized throughout the valve industry for many years. Attempted solutions have been to use much harder alloys, and more recently velocity containment. While these have helped somewhat, they have not eliminated the basic problem, namely, high velocity.

An important object of the present invention is to effect energy losses in high pressure flowing fluid without increasing velocity and shock wave reaction by subdividing the flow into a plurality of small, long [passages] *passageways* with abrupt turns creating a drag and pressure drop on the fluid, thus avoiding damage and erosion in the equipment.

Another object of the invention is to provide new and improved means for controlling and limiting fluid velocity to substantially that within the associated line or piping while quietly effecting energy losses.

A further object of the invention is to provide a stack of disks with [passages] *passageways* for dividing and controlling a high pressure flow stream in a plurality of smaller flow streams in each of which the fluid is directed in an angular energy absorbing path.

Still another object of the invention is to provide new and improved means for *reducing* pressure of a flowing pressurized fluid in a manner to eliminate problems of erosion, control, noise, and fatigue.

A yet further object of the invention is to provide high energy loss fluid control means having a wide range of versatility and usefulness.

Other objects, features and advantages of the present invention will be readily apparent from the following detailed description of certain preferred embodiments thereof taken in conjunction with the accompanying drawings, in which:

FIG. 1 is a longitudinal sectional detail view through a high energy loss fluid control device in the form of a valve;

FIG. 2 is an illustrative view of one of the friction loss subdividing passage disks such as may be employed in the device of FIG. 1;

FIG. 3 is an illustrative view of another such disk;

Figure 8:
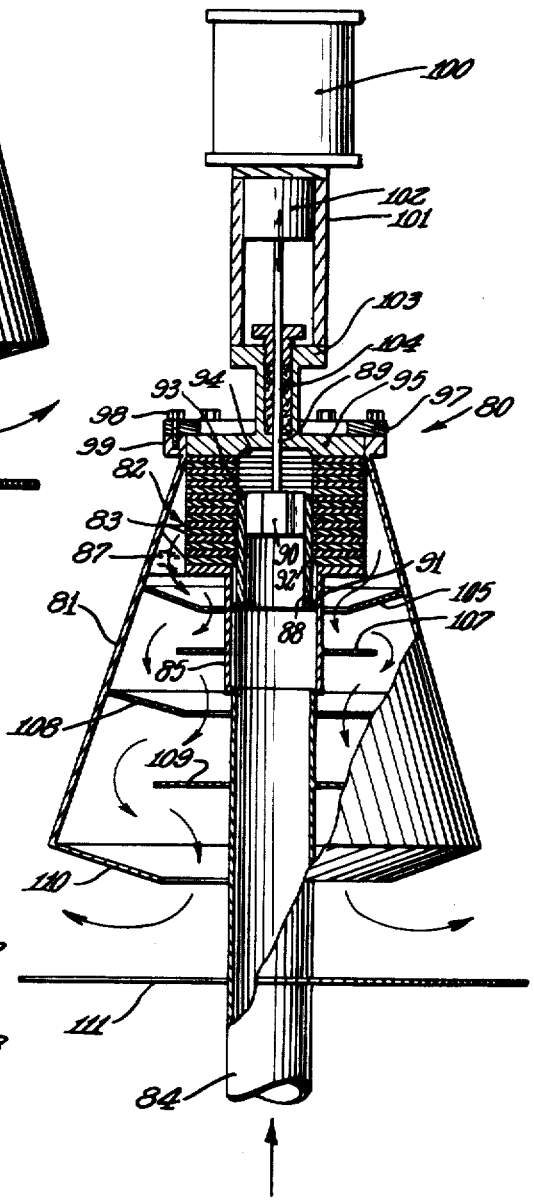
Figure 7:
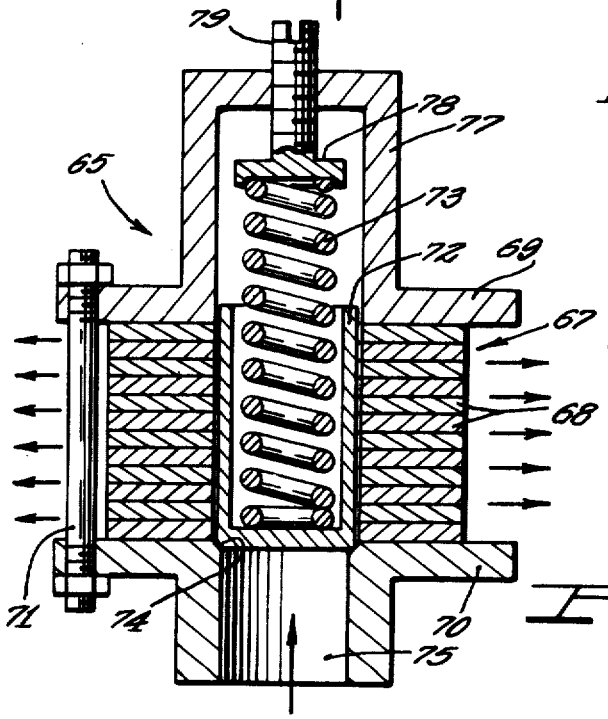

FIG. 7 discloses in a vertical sectional detail view an arrangement employing a stock of the multi-subdivision passage disks in a relief valve; and FIG. 8 discloses the use of the stacked disk velocity control device in a combination vent valve and muffler.

According to the present invention, high energy loss control of pressure fluid flow is attained by subdividing and confining the fluid in a plurality of individual streams each extending throughout a substantial length of travel, having a long length to diameter ratio to impart high frictional resistance losses to the fluid flow, being configurated along their length to assure efficient frictional resistance to fluid flow, and provided in and between laminated faces.

In one application of the principles of the invention, as shown in FIG. 1, a control valve assembly 25 includes a valve housing 27 within which a valve plug 28 is mounted in controlling relation to a passage 29 which extends through angularly related portions 30 and 31 having respective flanges 32 and 33 at their open ends by which the housing is adapted to be secured in fluid-tight communication with other members serving as continuations of the passage 29 in a flow system. For controlling the passage 29, the valve plug 28 is reciprocably mounted in the housing section 31 which has a head extension 34 within which the plug is slideably received in the fully open condition of the valve and from which the plug is projectable into throttling relation across the passage 29 to effect incremental closing between a fully open and a fully closed position wherein an annular valve shoulder 35 seats on a complementary valve seat 37 defining the juncture of the body sections 30 and 31 about which is an encompassing chamber 17. Reciprocal movements of the valve plug 28 are adapted to be ffected through a calve stem 28a extending through a packing gland 34a in the head end of the head chamber 34.

Figure 3A:
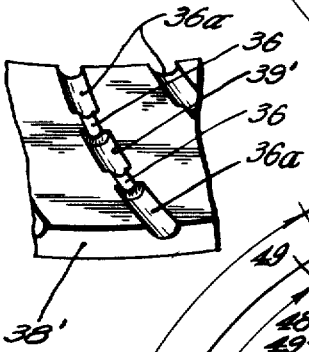
FIG. 3A illustrates another modification of the disk.
Figure 5:
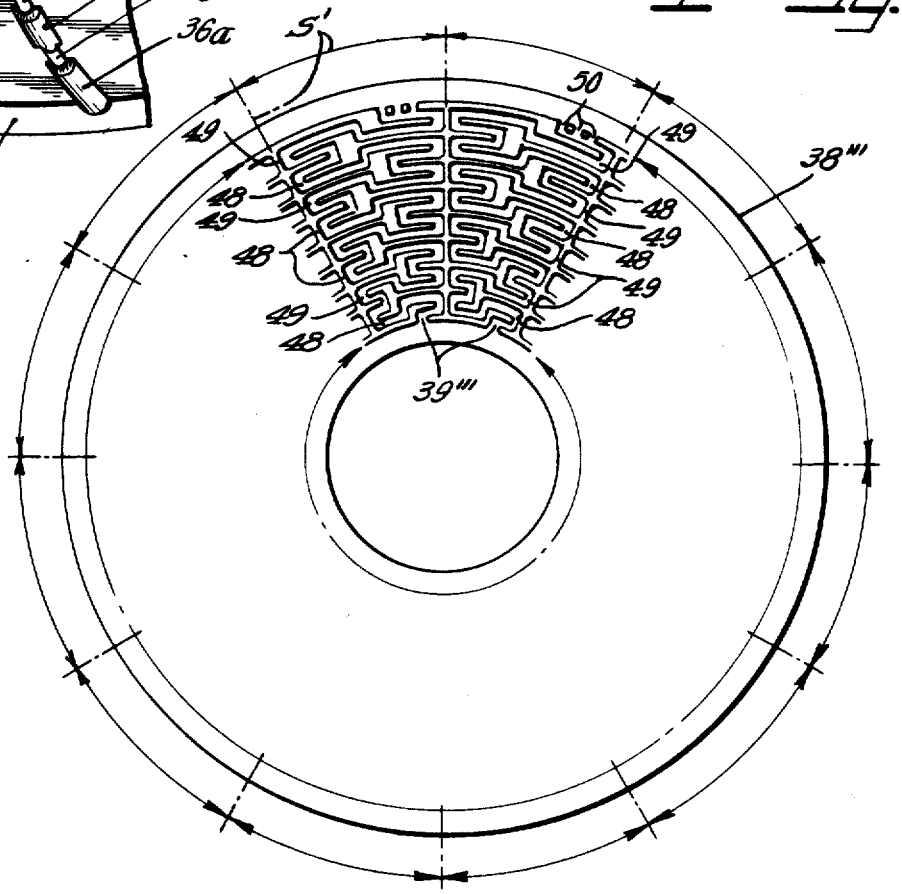
FIG. 5 is a plan view of another modification of subdividing passage disk showing another segmental area labyrinth arrangement.

To attain energy losses in the flowing medium in the passage 29, in either selective direction, without damaging velocities and abrupt pressure drop all fluid passing the plug 28 is subdivided into a plurality of individual streams of respective small cross-sectional flow area and substantial length to impose frictional resistance energy loss on the flowing fluid medium. In this instance, a plurality of stacked annular disks 38 is mounted within the chamber 17 and provides a continuation of the plug guiding surface afforded by the housing head 34 concentric with the housing portion 31 and extending across that part of the passage 29 in the housing portion 30. Frictional resistance controlling flow of the fluid through the annular column of the disks 38 is effected through subdividing and confining ducts or flow passageways 39 (FIG. 2) on at least one face of each of the disks, extending between and opening through the inner and outer perimeters or edges of the respective disks and closed from one another by the intervening land areas of the grooved disk and the abutting laminar face of the contiguous disk in the stack or surface at the end of the stack. In the form shown, the passageways 39 are of convolute angular form each occupying a sectoral area of the disk face and the loops increasing in length from the inner edge to the outer edge of the disk. This greatly extends the respective lengths and effectiveness of the passageways. Further, the passageways 39 are shown as comprising a substantial number of very small cross-sectional flow area grooves, which may be shallow scratch-like depressions in the face of the disk. In FIG. 3, the disk 38′ has grooves 39′ of different angularity in their length, in this instance of curved or spiral extent, and of substantial depth, as compared to the grooves 39. In FIG. 3A, each of the grooves 39′ has at least one restriction or abrupt contraction 36 (in this instance two) and then a succeeding abrupt expansion portion 36a in its length to increase the energy loss effectiveness of the grooves. It will be appreciated that the length, configuration and depth of the grooves 39, 39′ may be varied as preferred or needed to meet requirements. While all of the disks in the stack may be equally equipped with the fixed frictional resistance surface grooves 39, 39′, any preferred variation in the number, length, depth and configuration of the grooves may be provided on any disk in the stack or in various portions of the stack. Furthermore, the number and diameter of the disks may be varied as preferred or required. Great versatility to meet all kinds of situations is thus attained.

As the plug 28 is moved from fully open position within the head 34 toward *closed* or shut-off position, it progressively closes off the control passageway 39, 39′ across the successive disks and thus progressively diminishes the flow through the passage 29. All of the flow that does pass the plug 28 from fully open to fully closed position is subjected to frictional resistance energy loss in passing through the control passageways.

In the more or less schematic showing of FIG. 1, the valve housing 27 has been shown as a one-piece structure, as has also the valve plug 28. It will be appreciated, however, that any preferred multi-part structure may be afforded in either the housing or the valve plug or both. While the stack of disks 38 may be assembled with the housing as part of a casting or molding operation, the housing may, and desirably is, suitably separable to insert and remove the stack of disks 38 at will, and to enable dismounting of the disks for cleaning, and the like.

As pointed out hereinbefore, the basic problem in controlling valve operation, life and application is the high velocity attained by the flowing media as it passes through the valve. The velocity phenomenon can be simply stated as $V=\sqrt{2gh}$ wherein V is velocity, g is the gravitational constant, and h is the variable static pressure head across the valve seat. In all valves, V is a direct function of the pressure across the valve seat. In all valves, V is a direct function of the pressure across the valve seat, and V increases correspondingly with increasing pressure drop.

By dividing the flow stream into a plurality of small flow streams in the individual configurated passageways containing turns and/or restrictions, each turn and restriction reduces the pressure by one velocity head per turn, with the resultant effect of altering the basic velocity [equlation] *equation* to $V=\sqrt{2gh/N}$ with N representing the number of turns in the series in the individual passageways. This concept and technique enables control of both velocity and pressure to any degree desired *by providing passageways configurated along their length to have effective long length to diameter ratios to impart high frictional resistance losses to fluid flowing through them.*

Figure 4:
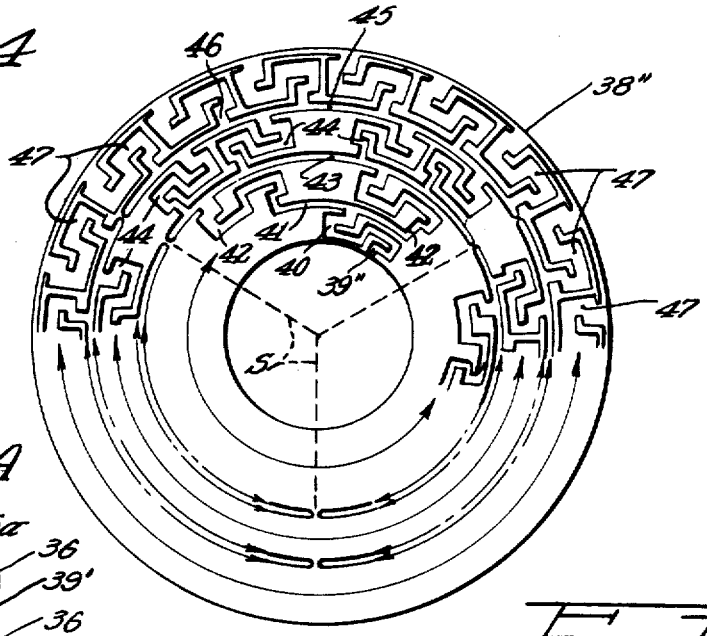
FIG. 4 is a plan view of a further modification of the disk showing a segmental area labyrinth arrangement.

For additional advantageous utilization of the principles of the invention in the development of resistance to flow, efficient accommodation to expansion of gases in the controlling passageways, ease of cleaning, compactness, ability to pressure-balance the valve poppet or plug and the ability to easily incorporate the most efficient valve sealing techniques, a generally labyrinth arrangement of the flow control passageways has been devised and has proved highly successful. One such arrangement is depicted in FIG. 4, wherein an annular disk 38″ has on at least one face thereof a plurality of flow subdividing and confining control passageways 39″, there being one of such passageways in each of a plurality of sectoral areas, graphically outlined by the radial sector lines S applied to FIG. 4, and in this instance three equal sectors. For large expansion capacity, a single passageway 39″ starting with one entrance opening at the inner edge of the disk 38″ progresses by multiple turns and branches to a plurality of outlets at the outer edge of the disk. As will be observed all of the turns in the passageways are substantially right angle turns. In a first section[,] 40, of the passageway into which its entrance [and] *end* extends there are shown eight successive substantially right angle turns, four of which are in circumferential direction and four of which are in radial direction, and one of which is in a radially inward direction while three are in a radially outward direction. From the first section 40, the passageway spreads in two directions circumferentially in an arcuate section 41 which is shorter than its portion of the sector and at each end of which there is a right angular radial turn leading into a respective multi-angular section 42 in which there are eight substantially right angle turns corresponding generally to the turns in the section 40. From the sections 42, the passageway 39″ progresses into an arcuate section 43 of a length substantially equal to the width of its portion of the sector and from which leads a plurality of, herein four, angular sections 44, each of which has eight substantially right angular turns, and which discharge into a final arcuate section 45 also extending throughout substantially the entire width of its portion of the sector. In its final progressive phase, the passageway 39'' comprises a plurality of eight-turn sections 47 of a greater number than the sections 44, and herein comprising six, leading from the arcuate section 45 and each discharging from the outer edge of the disk 38''. In addition to a progressive increase in number of angular sections, the flow area of each of the progressive groove sections may be enlarged with respect to the immediately preceding section or sections.

*In addition to the passageways 39'' subdividing or branching flow streams, they may also cause the recombination of previously subdivided or branched flow streams. As shown in FIG. 4, for example, in final arcuate section 45 of passageway 39'', at the position 46, and similar or analogous positions, there is a recombination of portions of the subdivided flow streams exiting the angular sections 44 intermediate arcuate section 43 and final arcuate section 45.*

In another desirable permutation, a disk 38'' may have on at least one of its faces a substantially greater number of sectors, identified by identifying graphic sector lines S' and herein shown as twelve in number. Each sector may be provided with a respective control passageway groove 39'''. In this arrangement, each of the grooves 39''' progresses in a generally labyrinth pattern in its sector by successive generally right angular, pressure reducing turns continuously along generally circumferentially lying S-shaped sections 48 alternating with similar but reversely extending sections 49 and which become progressively longer from the radially inner to the radially outer end of the passageway. It will be observed that in each of the sections 48 and 49 the fluid stream is subjected to eight turns. To avoid undue pressure drop at the exit end of the passageway 39''', while nevertheless taking advantage of the final angular turn, the exit may be provided with a plurality, herein three, openings 50.

In the operation of any of the disclosed arrangements, or other permutations thereof, the desirable relationship between the main stream and the controlling subdividing and confining passageways is such that the velocity in the latter approximates the velocity in the main stream downstream from the passageways. As a result the greatest amount of energy or pressure head is dissipated, cavitation eliminated, erosion of seat or trim in a valve structure eliminated, noise associated with cavitation or high velocity eliminated, vena contracta effects on valve control predictability eliminated, the destructive separation damage to molecular chains or polymers as a result of high valve velocity eliminated, and the like.

Figure 6:
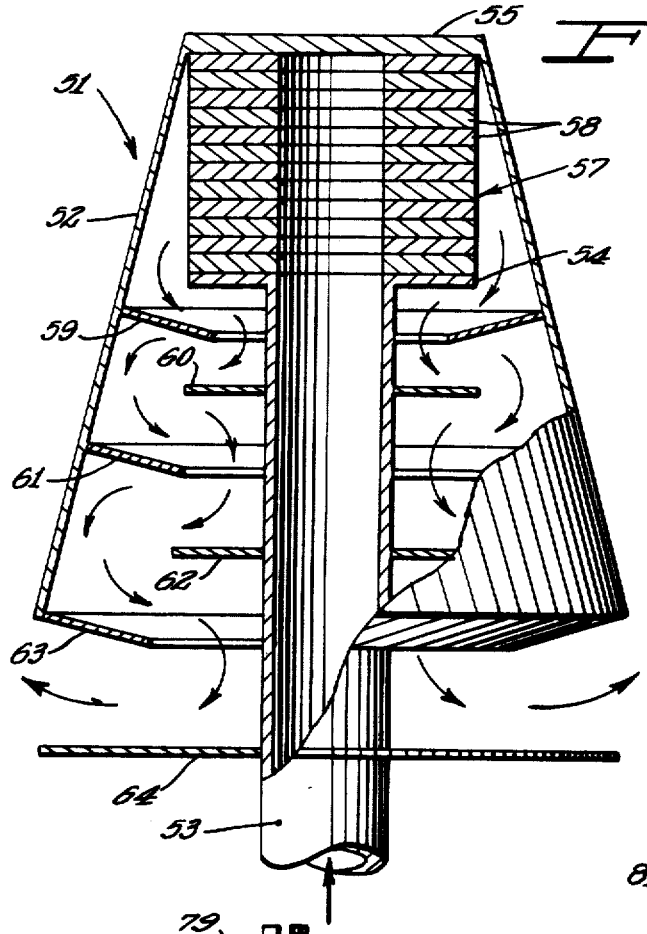
FIG. 6 is a side elevational and vertical sectional view disclosing the adaptation of a stack arrangement of multi-passage velocity control disks in a muffler.

In addition to use of the invention in control valve applications, many other uses for the highly efficient high energy loss fluid control will readily present themselves. For example, in FIG. 6 a high efficiency high pressure muffler 51 is depicted comprising a generally frustoconical shell hood 52 into which extends a delivery pipe tube 53 having on its inner end a laterally outwardly radial annular flange 54 between which and a narrow end closure 55 of the hood is mounted a stack 57 of control disks 58 provided with any preferred arrangement of the flow subdividing and confining flow passageways hereinbefore described by which high pressure fluid from the delivery tube 53 is dissipated with a large volume pressure drop further controlled by movement through a tortuous path in the expansion chamber provided by the hood 52 from the control disk stack 57 to the opposite wider end of the hood. As the expanding fluid flows on through the hood it is further muffled by being forced to travel a tortuous multi-angle path when the fluid on leaving the outer perimeter of the disk stack 57 is diverted by the hood wall to travel axially toward an annular intercepting baffle 59 extending inwardly from the hood wall into spaced concentric relation about the tube 53 providing an angular turn in fluid flow toward a second intercepting baffle 60 extending radially from the tube spaced downstream from the baffle 59 and of smaller diameter than the surrounding hood wall such that fluid is again forced to travel angularly toward the hood wall whence it is again angularly directed toward a third annular baffle 61 extending inwardly from the hood wall in axially spaced relation relative to the baffle 60 into spaced relation about the tubular inlet 53. Movement of the expanding fluid substantially repeats the movement forced by the baffle 59, and a succeeding annular inwardly bafffle 62 on the stem substantially repeats the fluid movement effected by the baffle 60 and the fluid finally moves angularly toward and past an end baffle 63 on the hood wall and toward an outward deflection baffle plate 64 carried by the tube 53 in suitable spaced relation beyond the wider end of the hood and the baffle 63. Thence, the now muffled and much expanded fluid flows outwardly from the gap between the baffles 63 and 64 to the atmosphere about the muffler 51 [and] which may be within a chamber in an industrial process or the natural atmosphere as preferred.

In another useful application of the invention, a high pressure relief valve (FIG. 7) is provided having an annular stack 67 of disks 68 having on at least one of their respective faces subdividing and confining passageways according to the principles of the invention and embodying any of the forms of such passageways hereinbefore described. In this instance the annular disk stack 67 provides part of the valve body with opposite end flange members 69 and 70 comprising the remainder of the body and secured together in clamping relation to the disk stack as by means of the tie bolts 71. This leaves the internal circumference and the outer circumference of the disk stack free for controlled fluid flow therethrough.

In this instance, the relief valve 65 is of the automatic pop-off type including a plunger or cup shaped plug 72 normally biased by means of a spring 73 into closing relationship on a seat 74 about the inner end of an inlet passage 75 in the housing flange member 70 concentric with the bore defined by the disk stack 67. For adjusting the compression and thus the pressure with which the spring 73 seats the valve plug 72, an end portion of the spring extends beyond the plug into a chamber provided within a cap portion 77 of the flange member 69 and a compression flange 78 thrust against the end of the spring and has a threaded stem-like stud 79 threadedly engaged in the end closure portion of the cap 74 whereby the spring 73 is readily adjustable for a desired pop-off pressure. As pressures increase beyond the pop-off pressure, and the plug 72 is driven progressively further from the seat 74 progressively greater area of the control disk stack or cage 67 is directly exposed to the pressure fluid which passes through the control passageways in the disks 68 as indicated by the directional arrows, and to the same effect as hereinbefore described.

In a combination [or] *of* relief or vent valve and muffler 80 (FIG. 8) a generally frusto-conical shell housing 81 has within its narrowest end portion an annular stack 82 of disks 83 provided with suitable subdividing and confining individual passageways to impart high frictional drag losses to high pressure fluid introduced into the inner end portion of the bore of the stack through an inlet pipe 84 suitably attached to the inlet end of a flange member 85 secured as by means of suitable spider structure 87 to the inside of the hood and in supporting relation to the stack 82. Control of fluid flow from the inlet through the stack is by means of a tubular valve plunger or plug 88 which is slidably engaged within the bore of the disk stack and is reciprocably operable by means of a valve stem 89 attached fixedly to the valve plug by means of a spider 90. For illustrative purposes, the plug 88 is shown in a partially open position relative to the control disk stack, but it is operable between full open and fully closed positions by means of the stem 89. In the fully closed position an annular radially outward tapered valve flange 91 on the inner end of the plunger 88 closingly engages a complementary seat 92 on the innermost disk of the control stack and an annular valve surface 93 on the outer end of the plunger closingly engages a complementary seat 94 on an end pressure seal bonnet flange member 95 compressibly engaging the outer end of the control disk stack 82 and removably held in place by a retaining ring clamping flange 97 secured as by means of screws 98 to an attachment flange 99 on the narrow end of the muffler hood 81.

Operation of the valve stem 89 to control the position of the plug 88 is effected in a preferred system-responsive or demand manner, as through an operating device 100 which may comprise a pressure responsive piston, a solenoid, and the like. As shown, the operating device 100 is mounted on a guide extension 101 for a plunger 102 extending from the device and to which the valve stem 89 is fixedly connected. Mounting of the guide 101 on the bonnet flange 95 is through a central flange extension 103 provided with a packing gland 104 through which the stem 89 extends.

On opening of the valve plug 88 high pressure fluid flows in energy-dissipating controlled relation through the stack 82 and into the muffler chamber and in a circuitous path therethrough to exit in substantially the same fashion as described in respect to the muffler 51, being successively diverted angularly inwardly by an inward first baffle 105, an annular outward second baffle 107, an annular inward third baffle 108, an annular [inward] *outward* fourth baffle 109, and finally inwardly to an exit opening defined by a fifth and inwardly directed annular baffle 110 on the widest end of the muffler hood. As it issues from the exit of the muffler hood, the expanded fluid is diverted radially by an annular baffle plate 111 on the inlet tube 84 spaced a preferred distance beyond the outlet end of the muffler hood.

*As indicated in the drawings and preceding description, there are disclosed rigid members having abutting faces forming therebetween a plurality of parallel flow passageways or ducts for the fluid at spaced levels or incremental positions along the axis of the rigid structure comprising the valve trim. Where, for example, the rigid structure is in the form of a vertically oriented right annular cylinder as shown in FIGS. 1, 6, 7 and 8, the spacing along the axis thereof between each grouping of a plurality of passageways can be said to be vertical. Consequently a control valve according to the embodiment of FIG. 1 has pluralities of parallel flow passageways arranged in vertically-spaced groupings. Most preferably there will be a significant number of such groupings so arranged with respect to each other that the valve plug will, in the course of its stroke from a fully closed to a fully open position or a position intermediate these points, essentially simultaneously open or close a plurality of parallel flow passageways at each level of valve position while opening or closing a plurality of groupings or sets of such parallel flow passageways in series. Thus a preferred embodiment of the invention can be said to include a rigid structure comprising a stack of members forming therebetween a plurality of individual passageways in parallel flow at spaced positions. Where, for example, a device is constructed to the general teachings of FIG. 1, the rigid structure is annular and comprising a stack of members, in this case disks, having abutting faces forming axially separated rows of generally radially directed passageways extending between the inner and outer circumferential walls of the structure.*

To afford an indication of the wide range of utility and applicability of the present invention a selected few specific examples may be given, namely, feed pump recirculation, desuperheater spray, turbine bypass, steam pressure reducers, relief valves, gas regulators, feedwater bypass, hotwell control, circulating pump seal, reheat spray, drum or steam blowdown, steam back pressure control, pump loading, level control, temperature control, pressure control, turbine load, superheater bypass, flash tank drain, let down for ammonia or various polymers such as polyethylene, urea and the like. Numerous other uses will readily suggest themselves and will become apparent.

It will be understood that variations and modifications may be effected without departing from the spirit and scope of the novel concepts of this invention.

I claim as my invention:

1. In a high energy loss flow control [device] *valve including a reciprocal valve plug to regulate the quantity of fluid flowing therethrough* for installation in a fluid transfer system where a potentially destructive or noise generating fluid pressure differential exists *such that heretofore cavitation, erosion and severe noise will occur*:

a rigid structure comprising a stack of members having abutting faces enclosing therebetween a plurality of individual passageway grooves angular between inlet and outlet ends thereof to turn the fluid and provide a substantially longer fluid flow length than the distance between the inlet and outlet ends thereof, and each passageway groove having an effective long length to diameter ratio cooperating with the angular turn-inducing configuration thereof to impart high frictional resistance losses to fluid flow therethrough *to a degree that damaging cavitation, erosion and severe noise do not occur in said passageways*; and means for compelling flow of the fluid through said passageways whereby potential energy will be dissipated and velocity of the fluid will be controlled[.], *said plug being in slidable contact with said stack of members, said inlet ends being positioned relative to said plug so they are selectively opened and closed to flow by the reciprocal action of said plug.*

2. A device according to claim 1, in which said members comprise annular disks.

3. A device according to claim 2, in which said grooves are located on respective sectoral areas of said disks.

4. A device according to claim 3, in which each of said grooves has at least one angular turn in its length.

5. A device according to claim 3, in which each of said grooves defines a tortuous path.

6. A device according to claim 5, in which the tortuous path of each of the grooves comprises a plurality of reverse bends.

7. A device according to claim 5, in which the tortuous path spreads circumferentially *and generally radially* from the [radially ] inner *opening* to the [radially] outer *opening on the circumference* portion of the [respective sector] *sectoral* area.

8. A device according to claim 5, in which said grooves have a plurality of substantially right angular turns.

9. A device according to claim 8, in which said turns direct the fluid alternately radially and circumferentially.

10. A device according to claim 9, in which each of the grooves has a plurality of successive sections in each of which there is a plurality of similar turns.

11. A device according to claim 10, in which each of the sections has eight turns.

12. [A device according to claim 10, in which] *In a high energy loss flow control device for installation in a fluid transfer system where a potentially destructive or noise generating fluid pressure differential exists:*

*a rigid structure comprising a stack of members having abutting faces enclosing therebetween a plurality of individual passageway grooves angular between inlet and outlet ends thereof to turn the fluid and provide a substantially longer fluid flow length than the distance between the inlet and outlet ends thereof, and each passageway groove having an effective long length to diameter ratio cooperating with the angular turn-inducing configuration thereof to impart high frictional resistance losses to fluid flow therethrough; and means for compelling flow of the fluid through said passageways whereby potential energy will be dissipated and velocity of the fluid will be controlled, said members comprise annular disks said grooves are located on respective sectoral areas of said disks, each of said grooves defines a tortuous path, said grooves have a plurality of substantially right angular turns, said turns direct the field alternately radially and circumferentially, and each of the grooves has a plurality of successive sections in each of which there is a plurality of similar turns,* each of the grooves has a circumferentially extending section which joins successively radially located and successively increasing number of sections having the respective pluralities of turns.

13. A device according to claim 1, in which each of the grooves provides a labyrinth flow path.

14. [A device according to claim 13, in] *In a high energy loss flow control device for installation in a fluid transfer system where a potentially destructive or noise generating fluid pressure differential exists:*

*a rigid structure comprising a stack of members having abutting faces enclosing therebetween a plurality of individual passageway grooves angular between inlet and outlet ends thereof to turn the fluid and provide a substantially longer fluid flow length than the distance between the inlet and outlet ends thereof, and each passageway groove having an effective long length to diameter ratio cooperating with the angular turn-inducing configuration thereof to impart high frictional resistance losses to fluid flow therethrough; and means for compelling flow of the fluid through said passageways whereby potential energy will be dissipated and velocity of the fluid will be controlled, each of the grooves provides a labyrinth flow path,* which [the labyrinth flow path] progressively increases in length and cross-sectional flow area from the inlet to the outlet.

15. [A device according to claim 13,] *In a high energy loss flow control device for installation in a fluid transfer system where a potentially destructive or noise generating fluid pressure differential exists:*

*a rigid structure comprising a stack of members having abutting faces enclosing therebetween a plurality of individual passageway grooves angular between inlet and outlet ends thereof to turn the fluid and provide a substantially longer fluid flow length than the distance between the inlet and outlet ends thereof, and each passageway groove having an effective long length to diameter ratio cooperating with the angular turn-inducing configuration thereof to impart high frictional resistance losses to fluid flow therethrough; and means for compelling flow of the fluid through said passageways whereby potential energy will be dissipated and velocity of the fluid will be controlled, each of the grooves provides a labyrinth flow path, which progressively increases in length and cross-sectional flow area from the inlet to the outlet and* in which the outlet for each of the [grooved passageways] *passageway grooves* has a plurality of openings.

16. [A device according to claim 1,] *In a high energy loss flow control device for installation in a fluid transfer system where a potentially destructive or noise generating fluid pressure differential exists:*

*a rigid structure comprising a stack of members having abutting faces enclosing therebetween a plurality of individual passageway grooves angular between inlet and outlet ends thereof to turn the fluid and provide a substantially longer fluid flow length than the distance between the inlet and outlet ends thereof, and each passageway groove having an effective long length to diameter ratio cooperating with the angular turn-inducing configuration thereof to impart high frictional resistance losses to fluid flow therethrough; and means for compelling flow of the fluid through said passageways whereby potential energy will be dissipated and velocity of the fluid will be controlled, and* having, in combination, a valve housing having a fluid passage of substantial cross-sectional flow area therethrough, said device comprising an annular structure mounted in said housing and across said passage to compel all fluid flowing through said passage to travel therethrough, and a valve plug movable in controlling relation reciprocably within said annular structure.

17. A combination according to claim 16, in which said annular structure comprises a stack of annular disks having said passageways in their faces and extending between and having openings at the inner and outer perimeters of the annular structure and adapted to be selectively opened and closed by movement of said plug in the annular structure.

18. [A device according to claim 1,] *In a high energy loss flow control device for installation in a fluid transfer*

*system where a potentially destructive or noise generating fluid pressure differential exists:*

*a rigid structure comprising a stack of members having abutting faces enclosing therebetween a plurality of individual passageway grooves angular between inlet and outlet ends thereof to turn the fluid and provide a substantially longer fluid flow length than the distance between the inlet and outlet ends thereof, and each passageway groove having an effective long length to diameter ratio cooperating with the angular turn-inducing configuration thereof to impart high frictional resistance losses to fluid flow therethrough; and means for compelling flow of the fluid through said passageways whereby potential energy will be dissipated and velocity of the fluid will be controlled, and* having, in combination, a muffler hood, said rigid structure being mounted in said hood, means defining [said] *a* fluid passage connected with said structure to compel all fluid to pass through said passageways, and a fluid path through said hood leading from said structure and having a plurality of baffles defining a tortuous flow path for the fluid after it leaves said structure.

19. In a combination according to claim 18, said structure comprising an annular disk stack in which said passageways comprise grooves on the faces of the disks, and a valve plug operable within the disk stack to control flow of the fluid therethrough.

20. A device according to claim 1, having at least one restriction and a succeeding abrupt expansion portion in the length of each of the grooves.

21. In a high energy loss flow control [device] *valve including a reciprocal plug to regulate the fluid flowing therethrough* for installation in a fluid transfer system where a potentially destructive or noise generating fluid pressure differential exists *such that heretofore cavitation, erosion and severe noise will occur:* a rigid structure comprising members having abutting faces and enclosing therebetween a plurality of individual passageways grooves each having at least one restriction and a succeeding abrupt expansion portion in its length between inlet and outlet ends thereof and each having an effective long length to diameter ratio to impart high frictional resistance losses to fluid flow therethrough[;] *to a degree that damaging cavitation, erosion and severe noise do not occur in said passageways* and means for compelling flow of the fluid into the inlet ends of said passageways *whereby potential energy will be dissipated and velocity of the fluid will be controlled, said plug being in slidable contact with said members, said inlet ends being positioned relative to said plug so they are are selectively opened and closed to flow by the reciprocal action of said plug.*

[22. In a high energy loss fluid control device having means defining a fluid flow passage, the improvement of means in said passage subdividing and confining fluid flow through the passage into a plurality of individual passageways, each having a long length to diameter ratio and a substantial number of abrupt turns between the inlet and outlet ends thereof creating a frictional drag and pressure drop on fluid flowing therethrough to dissipate potential energy of the fluid and control velocity of the fluid.]

23. [The device of claim 22] *In a high energy loss fluid control valve having means defining a fluid flow passage including a reciprocal valve plug to regulate the quantity of fluid flowing therethrough, the improvement of means in said passage subdividing and confining fluid flow through the passage comprising members having abutting faces enclosing a plurality of individual passageways, said individual passageways being arranged in said means so that there are a plurality of circumferentially spaced entrances of said passage ways on an axial level of said means, and a plurality of levels of said entrances, said plug in sliding contact with said members and all of said passageway entrances to selectively open and close said passageways to flow to thereby control the quantity of flow, each passageway having a long length to diameter ratio and a substantial number of abrupt turns between the inlet and outlet ends thereof creating a frictional drag and pressure drop on fluid flowing therethrough to dissipate potential energy of the fluid and control velocity of of the fluid to a degree that damaging cavitation, erosion and severe noise do not occur in said passageways, said improved second named means* wherein the passageways increase in flow area from the inlet to the outlet ends thereof to accommodate expansion of fluid as the pressure thereon is reduced.

*24. In a high energy loss flow control device for installation of a fluid transfer system where a potentially destructive or noise generating fluid pressure differential exists:*

*a rigid annular structure comprising members having abutting faces and enclosing therebetween a plurality of fixed resistance individual passageway grooves in parallel flow at spaced positions, each passageway groove configurated along its length (1) to have at least one restriction and a succeeding abrupt expansion portion in its length between inlet and outlet ends thereof and (2) to have an effective long length to diameter ratio to impart fixed high frictional resistance losses to fluid flow therethrough to dissipate potential energy of the fluid and control velocity of the fluid to a degree that damaging cavitation, erosion and severe noise do not occur in said passageways;*

*and means for compelling flow of the fluid into the inlet ends of said passageways, said means including a valve housing having a fluid passage of substantial cross-sectional flow area therethrough, said rigid annular structure mounted in said housing and across said passage to compel all fluid flowing through said passage to travel therethrough, and a valve plug in controlling relation to said plurality of passageways at spaced positions movable reciprocably within said annular structure.*

*25. In a high energy loss flow control device having means defining a fluid flow passage, the improvement of means in said passage subdividing and confining fluid through the passage into a plurality of individual passageways in parallel flow at spaced positions, each passageway having a long length to diameter ratio and a substantial number of abrupt turns between the inlet and outlet ends thereof creating a frictional drag and pressure drop on fluid flowing therethrough to dissipate potential energy of the fluid and control velocity of the fluid said first-mentioned means including a valve housing having a fluid passage of substantial cross-sectional flow area therethrough, said last-mentioned means comprising an annular structure mounted in said housing and across said passage to compel all fluid flowing through said passage to travel therethrough, and a valve plug in controlling relation to said plurality of passageways at spaced positions movable reciprocably within said annular structure, and the passageways increase in flow area from the inlet to the outlet ends thereof to accommodate expansion of fluid as the pressure therein is reduced.*

*26. In a high energy loss flow control device for installation in a fluid transfer system where a potentially destructive or noise generating fluid pressure differential exists: a valve housing having a fluid passage of substantial cross-sectional flow area therethrough, a rigid annular structure mounted in the housing and across the passage to compel all fluid flowing through the passage to travel therethrough, the annular structure comprising a stack of annular disks, each adjacent pair of disks having abutting faces enclosing therebetween a plurality of sectoral areas for parallel fluid flow, each including an individual passageway grooves configured along its length to be angular between inlet and outlet ends thereof to turn the fluid and provide a substantially longer fluid flow length than the distance between the inlet and outlet ends thereof and to have an effective long length to diameter ratio cooperating with the angular turn-inducing configuration thereof to impart high frictional resistance losses to fluid flow therethrough, and a valve plug movable in controlling relation reciprocably within the annular structure.*

*27. A device according to claim 26, wherein each of said passageways has only one inlet.*

*28. A device according to claim 27, wherein each of said passageways has more than one outlet.*

*29. In a high energy loss flow control device for installation in a fluid transfer system where a potentially destructive or noise generating fluid pressure differential exists: a valve housing having a fluid passage of substantial cross-sectional flow area therethrough, a rigid annular structure mounted in the housing and across the passage to compel all fluid flowing through the passage to travel therethrough, the annular structure comprising members having abutting faces and enclosing therebetween a plurality of axially and circumferentially spaced individual passageway grooves configured along their length so that each has two restrictions and an abrupt expansion portion intermediate the restrictions in its length between inlet and outlet ends thereof and has an effective long length to diameter ratio to impart high frictional resistance losses to fluid flow therethrough, and a valve plug movable in controlling relation reciprocably within said annular structure.*

*30. In a high energy loss flow control device for installation in a fluid transfer system where a potentially destructive or noise generating fluid pressure differential exists: a valve housing having a fluid passage of substantial cross-sectional flow area therethrough, a rigid annular structure mounted in the housing and across the passage to compel all fluid flowing through the passage to travel therethrough, the annular structure comprising members having abutting faces and enclosing therebetween a plurality of axially and circumferentially spaced individual passageway grooves configured along their length so that each has one turn and two restrictions and an abrupt expansion portion intermediate the restrictions in its length between inlet and outlet ends thereof and has an effective long length to diameter ratio to impart high frictional resistance losses to fluid flow therethrough, and a valve plug movable in controlling relation reciprocably within said annular structure.*

*31. In a high energy loss flow control device for installation in a fluid transfer system where a potentially destructive or noise generating fluid pressure differential exists, a valve housing having a fluid passage of substantial cross-sectional flow area therethrough, a rigid annular structure mounted in the housing and across the passage to compel all fluid flowing through the passage to travel therethrough, the structure comprising a stack of members having abutting faces enclosing therebetween a plurality of individual passageway grooves extending between the inner and outer perimeters of the annular structure and angular between inlet and outlet ends thereof to turn the fluid and provide a substantially longer fluid flow length than the distance between the inlet and outlet ends thereof, and each passageway groove having an effective long length to diameter ratio cooperating with the angular turn-inducing configuration thereof to impart high frictional resistance losses to fluid flow therethrough, and means including a valve plug movable in controlling relation reciprocably within the annular structure for compelling flow of the fluid through the passageway grooves whereby potential energy of the fluid will be dissipated and velocity of the fluid will be controlled.*

*32. In a high energy loss flow control device for installation in a fluid transfer system where a potentially destructive or noise generating fluid pressure differential exists, a valve housing having a fluid passage of substantial cross-sectional flow area therethrough, a rigid annular structure mounted in the housing and across the passage to compel all fluid flowing through the passage to travel therethrough, the structure comprising a stack of discs having abutting faces enclosing therebetween a plurality of individual passageway grooves extending between the inner and outer circumferential walls of the structure, each passageway groove configurated along its length to be (1) angular between inlet and outlet ends thereof to turn the fluid and provide a substantially longer fluid flow length than the distance between the inlet and outlet ends thereof, and (2) to have an effective long length to diameter ratio cooperating with the angular turn-inducing configuration thereof to impart high frictional resistance loses to fluid flow therethrough, and means including a valve plug movable in controlling relation reciprocably within the annular structure for selectively compelling flow of the fluid through the passageway grooves whereby potential energy of the fluid will be dissipated and velocity of the fluid will be controlled.*

*33. In a high energy loss fluid control device having means defining a fluid flow passage, the improvement of means in said passage subdividing and confining fluid flow through the passage into a plurality of individual passages, said last named means including a rigid annular structure comprising a stack of members having abutting faces forming axially separated rows of generally radially directed passageways extending between the inner and outer circumferential walls of the structure, the passageways of each row each having an effective long length to diameter ratio and a substantial number of abrupt turns between the inlet and outlet ends thereof creating a frictional drag and pressure drop on fluid flowing therethrough to dissipate potential energy of the fluid and control velocity of the fluid, and a valve plug movable in controlling relation reciprocably within the annular structure to selectively open and close the passageways of each row to flow of fluid therethrough.*

*34. A device according to claim 33, wherein each of said passageways provides a labyrinth flow path progressively increasing in cross-sectional flow area from the inlet to the outlet ends.*

*35. A device according to claim 33, wherein each of said passageways provides two restrictions and an abrupt expansion portion intermediate the restrictions between the inlet and outlet ends.*

*36. In a high energy loss flow control device for installation in a fluid transfer system where a potentially destructive or noise generating fluid pressure differential exists, a valve housing having a fluid passage of substantial cross-sectional flow area therethrough, a rigid annular structure*

*mounted in the housing and across the passage to compel all fluid flowing through the passage to travel therethrough, the structure comprising a stack of discs having abutting faces enclosing therebetween a plurality of individual passageway grooves extending between the inner and outer perimeters of the structure and angular between inlet and outlet ends thereof to turn the fluid and provide a substantially longer fluid flow length than the distance between the inlet and outlet ends thereof, and each passageway groove having an effective long length to diameter ratio cooperating with the angular turn-inducing configuration thereof to impart high frictional resistance losses to fluid flow therethrough, and means including a valve plug movable in controlling relation reciprocably within the annular structure for selectively compelling flow of the fluid through the passageway grooves whereby potential energy of the fluid will be dissipated and velocity of the fluid will be controlled.*

*37. A device according to claim 36, wherein each of said passageway grooves provides a labyrinth flow path progressively increasing in cross-sectional flow area from the inlet to the outlet ends.*

*38. A device according to claim 36, wherein each of said passageway grooves provides two restrictions and an abrupt expansion portion intermediate the restrictions between the inlet and outlet ends.*

*39. In a high energy loss flow control device for installation in a fluid transfer system where a potentially destructive or noise generating fluid pressure differential exists, a valve housing having a fluid passage of substantial cross-sectional flow area therethrough, a rigid annular structure mounted in the housing and across the passage to compel all fluid flowing through the passage to travel therethrough, the structure comprising a stack of members having abutting faces enclosing therebetween axially separated rows of individual passageway grooves extending between the inner and outer perimeters of the structure and angular between inlet and outlet ends thereof to turn the fluid and provide a substantially longer fluid flow length than the distance between the inlet and outlet end thereof, and each passageway groove having an effective long length to diameter ratio cooperating with the angular turn-inducing configuration thereof to impart high frictional resistance loses to fluid flow therethrough, and means for compelling flow of the fluid through the passageway grooves so that potential energy of the fluid will be dissipated and velocity of the fluid will be controlled, said last named means including a valve plug movable in controlling relation reciprocably within said annular structure to selectively open and close the passageway grooves of each row to flow of fluid therethrough.*

*40. In a high energy loss flow control device for installation in a fluid transfer system where a potentially destructive or noise generating fluid pressure differential exists, a valve housing having a fluid passage of substantial cross-sectional flow area therethrough, a rigid annular structure mounted in the housing and across the passage to compel all fluid flowing through the passage to travel therethrough, the structure comprising a stack of members having abutting faces enclosing therebetween a plurality of individual passageway grooves angular between inlet and outlet ends thereof to turn the fluid and provide a substantially longer fluid flow length than the distance between the inlet and outlet ends thereof, and each passageway groove having an effective long length to diameter ratio cooperating with the angular turn-inducing configuration thereof to impart high frictional resistance losses to fluid flow therethrough, and means including a valve plug movable in controlling relation reciprocably within the annular structure for compelling flow of the fluid through the passsageway grooves whereby potential energy of the fluid will be dissipated and velocity of the fluid will be controlled.*

*41. In a high energy loss flow control device for installation in a fluid transfer system where a potentially destructive or noise generating fluid pressure differential exists, a valve housing having a fluid passage of substantial cross-sectional flow area therethrough, a rigid annular structure mounted in the housing and across the passage to compel all fluid flowing through the passage to travel therethrough, the structure comprising a stack of members having abutting faces enclosing therebetween axially separated rows of generally radially directed individual passageway grooves extending between the inner and outer circumferential walls of the structure and angular between inlet and outlet ends thereof to turn the fluid and provide a substantially longer fluid flow length than the distance between the inlet and outlet ends thereof, the passageway grooves of each row each having an effective long length to diameter ratio cooperating with the angular turn-inducing configuration thereof to impart high frictional resistance losses to fluid flow therethrough, and means including a valve plug movable in controlling relation reciprocably with the annular structure for compelling flow of the fluid through the passageway grooves whereby potential energy of the fluid will be dissipated and velocity of the fluid will be controlled.*

*42. In a high energy loss flow control device for installation in a fluid transfer system where a potentially destructive or noise generating fluid pressure differential exists, a valve housing having a fluid passage of substantial cross-sectional flow area therethrough, a rigid annular structure mounted in the housing and across the passage to compel all fluid flowing through the passage to travel therethrough, the structure comprising a stack of discs having abutting faces enclosing therebetween a plurality of individual passageway grooves extending between the inner and outer perimeters of the structure and angular between inlet and outlet ends thereof to turn the fluid and provide a substantially longer fluid flow length than the distance between the inlet and outlet ends thereof, and each passageway groove having an effective long length to diameter ratio cooperating with the angular turn-inducing configuration thereof in order that potential energy of the fluid will be dissipated and velocity of the fluid will be controlled, and means including a valve plug movable in controlling relation reciprocably within the annular structure for selectively compelling flow of the fluid through the passageway grooves.*

* * * * *